C. I. HALL.
INTEGRATING ELECTRICITY METER.
APPLICATION FILED AUG. 24, 1911.

1,125,312.

Patented Jan. 19, 1915.
3 SHEETS—SHEET 1.

Witnesses:
Leonard W. Novander.
Robert F. Brache.

Inventor
Chester I. Hall
By Brown Williams
Attorneys

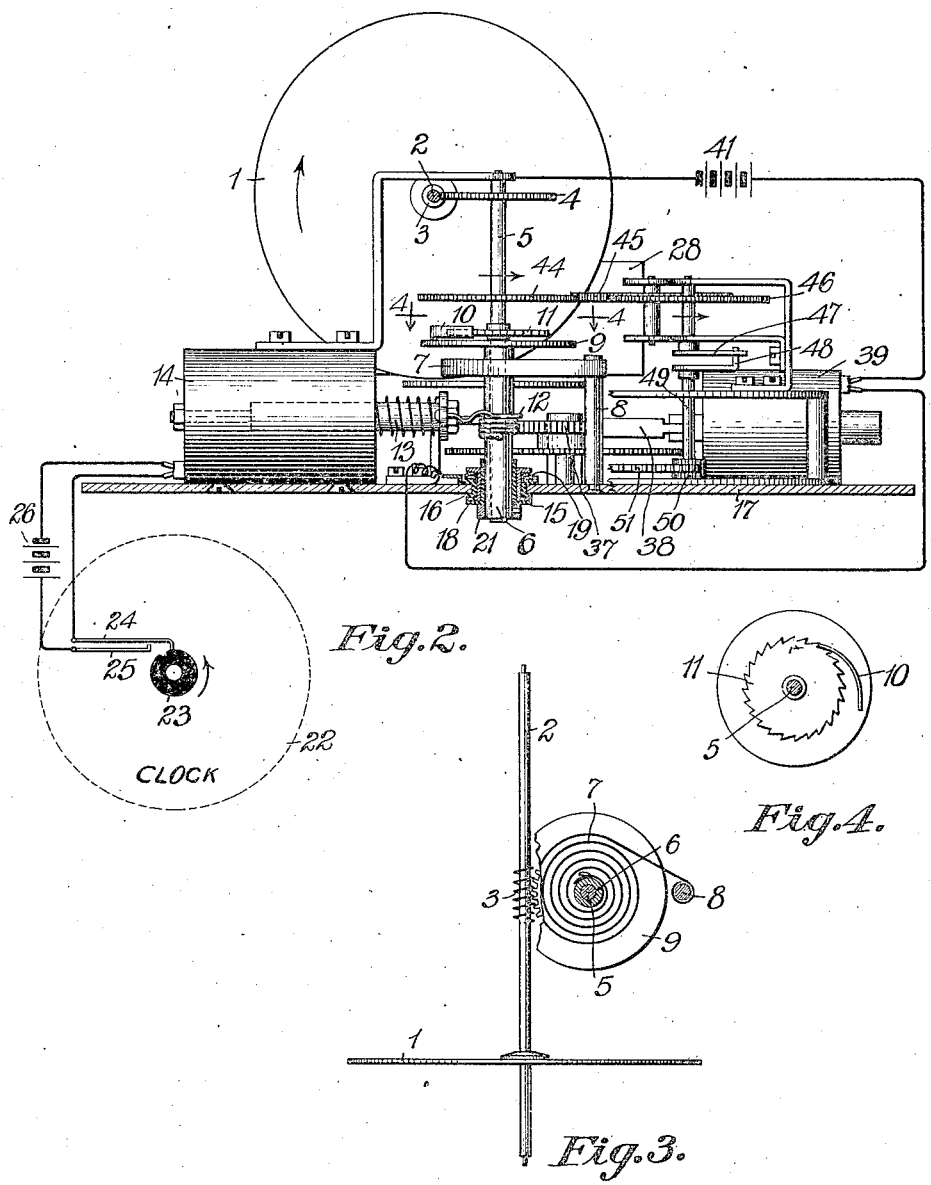

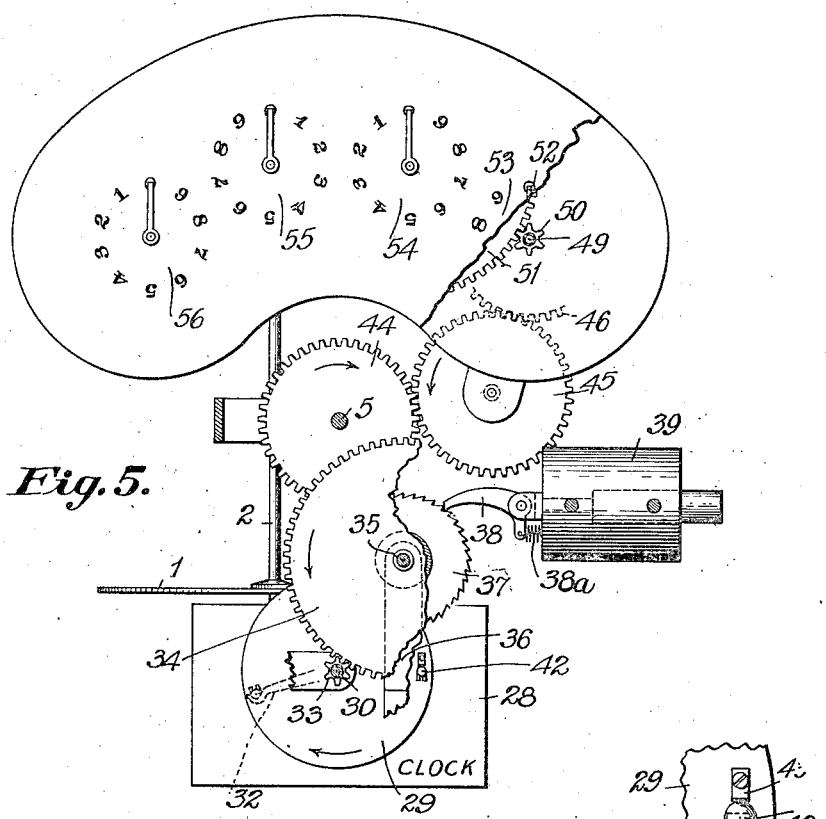

UNITED STATES PATENT OFFICE.

CHESTER I. HALL, OF CHICAGO, ILLINOIS, ASSIGNOR, BY MESNE ASSIGNMENTS, TO CHICAGO ELECTRIC METER COMPANY, OF CHICAGO, ILLINOIS, A CORPORATION OF ILLINOIS.

INTEGRATING ELECTRICITY-METER.

1,125,312.  Specification of Letters Patent.  Patented Jan. 19, 1915.

Application filed August 24, 1911. Serial No. 645,771.

*To all whom it may concern:*

Be it known that I, CHESTER I. HALL, a citizen of the United States, residing at Chicago, in the county of Cook and State of Illinois, have invented a certain new and useful Improvement in Integrating Electricity-Meters, of which the following is a full, clear, concise, and exact description, reference being had to the accompanying drawings, forming a part of this specification.

My invention relates to integrating electricity meters, and more particularly to apparatus for indicating or recording the time and amount of the maximum consumption of energy.

When electricity is furnished to consumers it is very desirable in order to fix the rate to be charged to each user to know the hour of the day when he uses the most electricity, that is to say, whether his maximum consumption occurs during the hours when the greatest demand is made upon the central station, or whether he uses the most energy during off peak hours, or that part of the day when there is not so great a demand upon the power plant.

My invention contemplates mechanism for making a record of the hour at which such maximum consumption of energy occurs.

My invention enables me to know at a glance the hour or other period during which the consumer has used the greatest amount of energy, thus enabling me to fix the rate of charge accordingly.

In conjunction with the apparatus forming the subject of my invention I find it advantageous to use a maximum energy indicating means, the advancement of which is controlled by the integrating meter mechanism. I employ suitable power aside from that imparting motion to the meter in order to advance the indicating means.

A circuit which is controlled by the indicating means, serves when closed to set in motion the mechanism by which a record is made of the hour when the maximum consumption of energy occurs.

Figure 1:
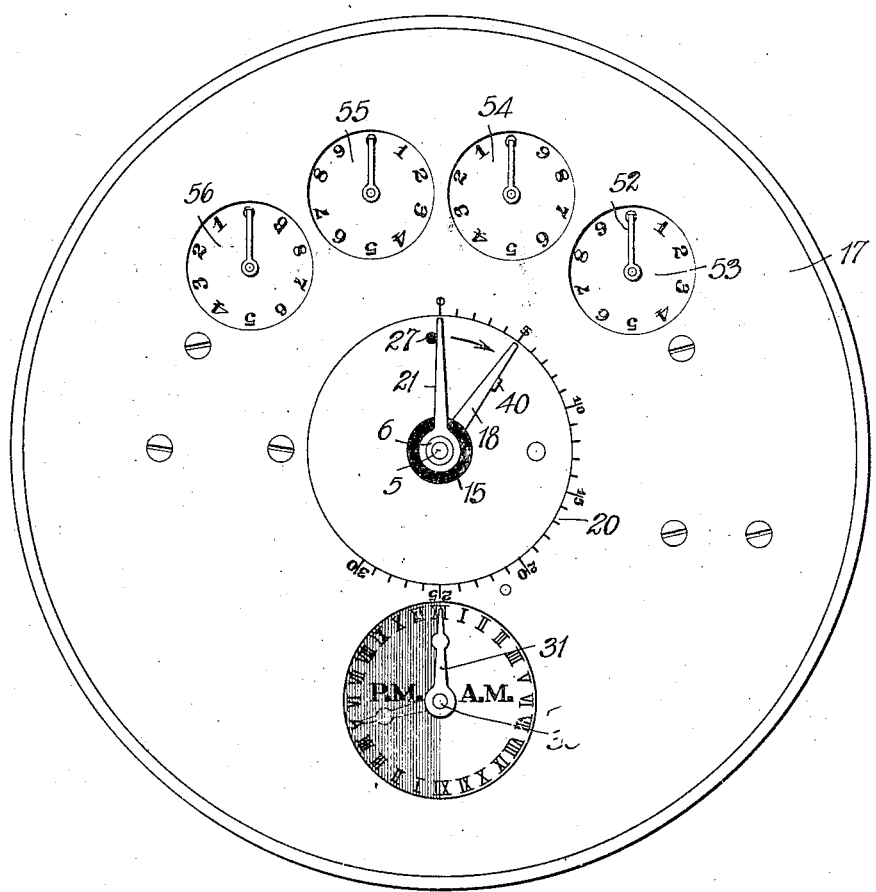
Figure 9:
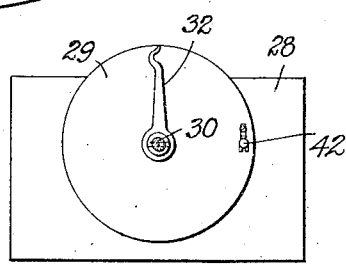

I have shown in the accompanying drawings one specific embodiment of my invention and in which, Figure 1 is a face view of a watt hour meter showing the maximum energy indicating mechanism, and also an hour dial to indicate the time. Fig. 2 is a cross-sectional view taken on a horizontal plane through the center of the meter and partly showing the integrating mechanism directly above this plane. Fig. 3 is a view of a disk used in connection with a watt hour meter and the spring which is used as the motive power for advancing the maximum energy indicator. Fig. 4 is a sectional view taken on line 4—4 of Fig. 2. Fig. 5 is a view taken partly in section directly behind the dial of the meter, some of the parts being left out in order to more clearly illustrate the construction. Fig. 6 is a sectional view taken partly through the hour dial and partly in a plane directly above that. Fig. 7 is a side view of a disk and associated mechanism which is used with the timing element of my invention. Fig. 8 is a face view of the parts shown in Fig. 7. Fig. 9 is an elevation view more or less diagrammatic of the timing apparatus used in conjunction with the other features of my invention.

At the outset I may state that in order to simplify the specification and drawings I have omitted the greater part of the mechanism used in conjunction with a watt hour meter. A drag disk 1 is mounted upon a torque spindle 2 which has thereon a worm 3 adapted for engagement with the worm-wheel 4, which in turn is mounted on the spindle 5, this spindle having loosely mounted upon it a sleeve or quill 6 which has fastened thereto a spiral spring 7, one end of which is secured to a post 8. At one end of the sleeve 6 there is secured a disk 9 which supports a spring pawl 10 which engages a ratchet 11. The sleeve 6 has also secured thereto a cord or flexible cable 12, one end of which is secured to the core 13 of an electromagnet 14 which may be suitably mounted. The sleeve 6 is journaled at one end in the bushing 15 of insulating material and a bushing 16 of insulating material is held tightly in the plate 17 and forms in connection with the bushing 15 means by which the member 18 is completely insulated from the meter mechanism. The maximum indicator 18 is frictionally mounted by means of a friction spring 19, thus permitting the indicator 18 to be advanced over the dial 20 so that it will stay in any position to which it is turned. The outer end of the sleeve 6 has fastened thereto a driving pointer 21 which is employed to advance the indicator 18 in a manner which will be described.

As the disk 1 of the meter rotates it permits the worm 3 to act as an escapement for the advancement of the gear 4 by means of the torque on the spindle 5 caused by the power spring 7. This is done by the engagement of the spring pawl 10 with the ratchet 11. This has the effect of advancing or rotating the driving pointer 21 and through its engagement with the lug 40 on the maximum indicator 18, said indicator is also advanced to indicate the maximum energy consumed during any interval of time, such for example as every five minutes or any other predetermined time. In order to secure the proper advancement during every five-minute period, I have employed clock mechanism shown diagrammatically at 22 which has in conjunction therewith a cam 23 for causing a momentary connection between the springs 24 and 25, thereby closing a circuit through the battery 26 and thus energizing the electromagnet 14. When this magnet is energized at the end of a predetermined period it will serve to rewind the spring 7 to its initial position so that it will be in a condition to again operate the driving pointer 21. In other words, suppose for example, that the driving pointer 21 is returned to its initial position against the stop pin 27 after advancing the indicator 18, which remains at the position to which it may have been driven during the first five-minute interval. If during the second five-minute period the driving pointer 21 is advanced farther than it was during the first period, due to a larger consumption of energy during the second period than during the first, the indicator 18 will be engaged when the driving pointer reaches the point to which it advanced during the last interval, and the two pointers will move together until the end of the second five-minute period. At that instant the electromagnet 14 operates to return the driving pointer to its initial position, leaving the indicator 18 at a position in advance of that to which it was driven during the first period and where it will indicate the consumption of energy during the second five-minute interval.

During the third five-minute interval the consumption of energy may be less than during the second interval, in which case the driving pointer 21 will not be advanced far enough to engage the indicator 18, with the result that the indicator will remain in the position to which it was advanced during the second interval. Thus it will be seen that at the end of the month the indicator 18 will be found in a position upon its dial corresponding with the consumption of electrical energy during that period in which the consumption was greatest.

I have found it desirable to know the time when the maximum amount of energy consumed occurred and to this end I employ a timing element 28 which is more or less diagrammatically shown and which has operating in conjunction therewith a disk 29 which is adapted to make one complete revolution in every twenty-four hours. In conjunction with this particular mechanism I have employed means by which the time of the maximum energy consumption can be ascertained by looking at the face of the meter, which has thereon a dial indicating a. m. and p. m. periods of twelve hours each to correspond with any position of the disk 29. To this end there is rigidly mounted upon the spindle 30 an hour hand 31 adapted to pass over the hour dial and on the rearward end of the spindle 30 I employ a hand 32 which lies in the same plane with the hour hand 31, the hand 32 being fastened to the spindle 30. A pinion 33 is mounted on the spindle 30 and meshes with a gear 34 which is suitably mounted upon a shaft 35, one end of which engages in the plate 17 and the other of which is supported by means of a bracket 36 extending from the plate 17. A ratchet 37 is rigidly mounted with respect to the gear 34 and is engaged by a spring dog 38 which is adapted to be operated by means of an electromagnet 39, the spring 38ª serving to keep the dog 38 in engagement with the ratchet. This electromagnet is energized when the driving pointer 21 and indicator 18 are brought into engagement by means of the lug 40 on the indicator 18. Thus it will be seen that when the indicator 18 is being advanced according to the amount of energy consumed, it closes a circuit through the battery 41, thereby energizing the electromagnet 39 and causing the advancement of the ratchet 37 and through the associated mechanism, the indicators 31 and 32.

It will be understood that the disk 29 rotates constantly under the influence of the clock mechanism 28 and this disk is provided with a pin 42 pivotally mounted thereon, and against one side of which there is a comparatively weak spring 43. When the electromagnet 39 is energized, the gearing ratio being such that the hands are rotated until the hand 32 comes into engagement with the pin 42 of the disk, this hand 32 will rotate and follow up the pin each time that the circuit is closed through the driving pointer 21 and indicator 18. The pin then controls and determines the position of the hour hands 31 and 32. The electromagnet will be energized just as long as the connection is continued between the indicators 18 and 21, and when said connection is broken the electromagnet 39 is restored to its initial or normal position as shown in the drawings by means of the spring 38ᵃ. The energization of the electromagnet 39 holds the arm 32 against the pin 42 in the direction of its motion derived from the clock-work 28, from which it will appear that the pin 42 limits the motion of the arm 32, and thus of the hand 31, which causes the hand 31 to occupy a position on the dial corresponding to the time of energization of the electromagnet 39. If, during a certain period, for example one month, there was a maximum energy consumption at 5 o'clock, p. m., as shown in dotted lines in Fig. 1, the pin 42 on the disk 29 having previously been rotated to a position so that when the pointer 32 engages the pin there will be no further rotation of said arms because this represents the maximum demand position. The driving pointer 21 will not engage the lug 40 on the indicator 18 again during that particular month, and consequently the electromagnet will not be again energized. The hands then will be held in this position during the remainder of the month and the hour disk 29 will merely slip by the hand 32 owing to the spring bearing against one side of the pin 42. This condition continues until the meter reader notes the indications of the integrating mechanism as well as the maximum demand indicator and the hour at which it occurred when he re-sets the mechanism, namely, rotates the pointer 18 back to its normal position against the pointer 21 when the same cyclic operation will be carried out as heretofore described to indicate the maximum energy consumption for the ensuing month.

From the foregoing explanation it will be apparent that my arrangement affords means whereby the time at which the maximum consumption of energy occurs may be ascertained at a glance, thus enabling me to easily establish the rate to be charged a consumer accordingly.

It is well known that when electricity is furnished to consumers, a difference is made in the rate charged to those who use the energy during off peak hours, and those who use the energy during peak hours, or that period of the day when the demand is greatest upon the power station.

I do not wish to limit the scope of my invention to the indication of the hour when such demand occurs, but I wish it to include means for indicating any particular day or days, or week, and in fact any convenient period during which it is desired to know the maximum demand of energy.

I shall now describe briefly the integrating watt hour mechanism used in conjunction with my invention. To this end there is secured on the spindle 5 a gear 44 which meshes with a gear 45, which in its turn engages a gear 46 which operates an arm 47 that engages an arm 48 secured to a spindle 49 at one end of which is a pinion 50 meshing with a gear 51. The spindle 49 has secured thereto at its outer end an arm 52 which passes over a dial 53 of the integrating watt hour mechanism. The gears leading to the dials 54, 55 and 56 are similar to those in connection with the dial 53 and further explanation is deemed unnecessary.

In the foregoing explanation I have not thought it necessary to describe very fully the bearings for each of the parts because it is apparent that any convenient and well known means may be employed to secure the proper bearing relations desired.

While I have shown and described one specific embodiment of my invention, I do not wish to limit myself to the precise disclosures shown and described because it will be apparent to those skilled in the art that modifications may be made without departing from the spirit and scope of my invention.

I desire to secure the following claims by Letters Patent:

1. In combination, a motor whose rotation depends upon and varies with the amount of energy required in an electric circuit, indicating means controlled by said motor and adapted for showing the maximum energy consumed in said circuit, an electromagnet the energization of which is controlled by said indicating means, time indicating apparatus, said electromagnet when energized serving to cause the movement of said time indicating apparatus, and a time element for controlling the position of said time indicating apparatus.

2. In combination, a motor whose rotation depends upon and varies with the amount of energy required in an electric circuit, indicating means controlled by said motor and adapted for showing the maximum energy consumed in said circuit, an electromagnet the energization of which is controlled by said indicating means, time indicating apparatus, gearing mechanism associated with said time indicating apparatus, said electromagnet when energized serving to impart motion to said gearing mechanism thereby causing motion of said time indicating apparatus, and a time element normally independent of said time indicating apparatus and adapted for determining the position of said apparatus.

3. In combination, a motor whose rotation depends upon and varies with the amount of energy required in an electric circuit, indicating means controlled by said motor and adapted for showing the maximum energy consumed in said circuit, an electromagnet the energization of which is controlled by said indicating means, time indicating apparatus, gearing mechanism associated with said time indicating apparatus, said electromagnet serving to actuate said apparatus through said gearing mechanism, and a clock normally out of engagement with said time indicating apparatus, controlling means on said clock, said controlling means adapted for determining the position of said time indicating apparatus.

4. In combination, a motor whose rotation depends upon and varies with the amount of energy required in an electric circuit, indicating means controlled by said motor and adapted for showing the maximum energy consumed in said circuit, an electromagnet the energization of which is controlled by said indicating means, time indicating apparatus, gearing mechanism associated with said time indicating apparatus, said electromagnet serving to actuate said apparatus through said gearing mechanism, and a clock normally out of engagement with said time indicating apparatus, a disk on said clock, means on said disk for determining the position of said time indicating apparatus.

5. In combination, a watt hour meter, indicating means for showing the maximum demand of energy in an electric circuit during a certain period, and an electromagnet controlled by said indicating means, a time pointer, said electromagnet when energized causing actuation of said pointer, and clock mechanism adapted for determining the position of said time pointer.

6. In combination, a watt meter, indicating means for showing the maximum amount of energy consumed in an electric circuit, a motor for permitting the advancement of said indicating means, spring mechanism for advancing said indicating means, an electromagnet controlled by said indicating means, a time pointer, said electromagnet when energized causing actuation of said pointer, and time controlled mechanism adapted for determining the position of said time pointer.

7. In combination, a watt hour meter, a motor whose rotation depends upon and varies with the amount of energy required in an electric circuit, indicating means for showing the maximum energy consumed in a certain period in said circuit, an electromagnet controlled by said indicating means, a time pointer, said electromagnet when energized causing actuation of said pointer, and clock mechanism adapted for determining the position of said time pointer.

8. In a device of the class described, the combination of a motor mechanism whose rotation is proportional to and varies as to energy supplied to an electric circuit, a register driven by said motor mechanism, indicating mechanism for showing the maximum amount of energy consumption in a certain period, a driving spring, indicating driving mechanism actuated by said spring, a gear connected with the motor mechanism, a pawl and ratchet connection between said gear and said driving mechanism, an electromagnet adapted by energization to return the indicating driving mechanism to its normal position, a time controlled switch for periodically closing the circuit of the electromagnet, and time indicating means controlled by said indicating mechanism.

9. In a device of the class described, the combination of a motor mechanism whose rotation is proportional to and varies as to energy supplied to an electric circuit, a register driven by said motor mechanism, indicating mechanism for showing the amount of maximum energy consumption, a driving spring, indicating driving mechanism actuated by said spring, a gear connected with the motor mechanism, a pawl and ratchet connection between said gear and said driving mechanism, an electromagnet adapted by energization to return the indicating driving mechanism to its normal position, a time controlled switch for periodically closing the circuit of the electromagnet, a solenoid controlled by said indicating mechanism, time indicating means, said solenoid when energized causing actuation of said time indicating means, and clock mechanism for controlling the position of said time indicating means.

10. In a device of the class described, the combination of a motor mechanism whose rotation is proportional to and varies as to energy supplied to an electric circuit, a register driven by said motor mechanism, indicating mechanism for showing the amount of maximum energy consumption, a driving spring, indicating driving mechanism actuated by said spring, a gear connected with the motor mechanism, a pawl and ratchet connection between said gear and said driving mechanism, an electro-magnet adapted by energization to return the indicating driving mechanism to its normal position, a time controlled switch for periodically closing the circuit of the electromagnet, a solenoid controlled by said indicating mechanism, a time pointer, said solenoid when energized causing actuation of said pointer, and clock mechanism adapted for determining the position of said time pointer.

11. In a device of the class described, the combination of a motor mechanism whose rotation is proportional to and varies as to energy supplied to an electric circuit, a register driven by said motor mechanism, indicating mechanism for showing the amount of maximum energy consumption, a driving spring, indicating driving mechanism actuated by said spring, a gear connected with the motor mechanism, a pawl and ratchet connection between said gear and said driving mechanism, an electro-magnet adapted by energization to return the indicating driving mechanism to its normal position, a time controlled switch for periodically closing the circuit of the electro-magnet, a solenoid controlled by said indicating mechanism, an hour indicator secured upon a spindle, said solenoid when energized causing actuation of said hour indicator, a clock mechanism, a disk associated therewith, and means upon said disk for determining the position of said hour indicator, said disk being disposed in proximity to said indicator.

12. In combination, a meter, a member operated only during and proportionally to the maximum operation of the meter, and mechanism for indicating the time of maximum operation of said member.

13. In combination, a meter, a member operated only during and proportionally to the maximum operation of the meter, mechanism for indicating the time of maximum operation of said member, and time controlled mechanism for determining the position of said mechanism.

14. In combination, a meter, a member operated only during and proportionally to the maximum operation of the meter, mechanism for indicating the time of maximum operation of said member, an electromagnet for advancing said mechanism, and an electric contact operated by said member when actuated to control the operation of said electromagnet.

15. In combination, a meter, a member operated only during and proportionally to the maximum operation of the meter, means for indicating the time of maximum operation of said member, time controlled mechanism for determining the position of said means, an electromagnet for advancing said means, and an electric contact operated by said member when actuated to control the operation of said electromagnet.

In witness whereof, I hereunto subscribe my name this 19th day of August, A. D. 1911.

CHESTER I. HALL.

Witnesses:
LEONARD W. NOVANDER,
ROBERT F. BRACKE.